United States Patent [19]

Zuzack

[11] Patent Number: 5,052,564

[45] Date of Patent: Oct. 1, 1991

[54] COMPACT DISC DISPLAY RACK

[76] Inventor: John D. Zuzack, 2634 Carousel Dr., St. Louis, Mo. 63125

[21] Appl. No.: 377,091

[22] Filed: Jul. 10, 1989

[51] Int. Cl.$^5$ .............................................. A47G 29/00
[52] U.S. Cl. ................................... 211/40; 206/45.14; 206/309; 206/444
[58] Field of Search ..................... 211/40, 41; 206/444, 206/309, 45.14, 45.18

[56] References Cited

U.S. PATENT DOCUMENTS

| | | | |
|---|---|---|---|
| 4,102,458 | 7/1978 | Fors | 211/40 X |
| 4,317,603 | 3/1982 | Pepicelli et al. | 211/40 X |
| 4,684,027 | 8/1987 | Wright | 211/40 |
| 4,715,669 | 12/1987 | Baillie et al. | 211/40 X |
| 4,793,665 | 12/1988 | King | 211/40 X |
| 4,815,795 | 3/1989 | Accumanno | 211/40 |
| 4,867,306 | 9/1989 | Factor | 211/40 X |
| 4,940,147 | 7/1990 | Hunt | 248/205.2 X |

Primary Examiner—David L. Talbott
Attorney, Agent, or Firm—Norman L. Wilson, Jr.

[57] ABSTRACT

Since they should not be stacked, display racks are generally used to hold such objects as compact discs, video discs, records and the like. In display racks compact discs can be displayed for sale, and for showing them at home. Because of their generally planar structures, originally discs and records were stored in bins or troughs. But the most desirable display racks are those which display and advertise the articles as well as store them. In view of the art work which is customarily utilized on envelopes or jackets in which such objects are sold it is beneficial to aesthetically exhibit them. This is done by disposing them adjacent each other in registered relationship relative to each other in an aesthetically desirable display so that they are arranged side-by-side in picture fashion. The disadvantage of such displays is that in such arrangements individual discs are quite difficult to remove because of their proximity to each other and to the shelves which hold them. By this invention means are provided for urging them out.

10 Claims, 2 Drawing Sheets

COMPACT DISC DISPLAY RACK

BACKGROUND OF THE INVENTION

This invention relates to display apparatus or racks for holding generally planar objects or articles, such as discs, tapes, records, and the like. The display rack is especially suited for compact discs, but it will also be used for holding phonograph records, and video or magnetic discs in jackets with thin edges.

As is true of phonorecords, compact discs, or CDs, can be impaired or harmed if they are stacked. In addition the edges of their jackets are so thin that the compact discs cannot be identified from them. The thin edges do not permit the use of clearly printed compact disc titles.

Most owners of compact discs want them near their equipment. They want them in a drawer or bin deep enough to stand them in. More important, owners like them displayed. The outstanding art work on compact disc jackets lends itself to an aesthetic presentation of the compact discs. Hence there is a need for some sort of home display means for compact discs.

Commercially, because of their generally planar structures, discs, records and the like were originally stored in bins or troughs with outwardly sloping sides. Later, racks such as those in 3,275,158, 3,752,545, and 4,573,588 having dividers or supports were employed. However, the most desirable display racks are those which both display and advertise the articles as well as storing them. An example of this type of display rack can be found in 2,649,968. In that patent panels hold the planar articles in place.

As emphasized in 4,367,000 it is beneficial to aesthetically exhibit records and discs because of their artistic sleeves or jackets. Since they are entertainment objects, it is important to take advantage of the art work which is customarily utilized on envelopes or jackets in which such objects are sold.

In 4,367,000 chambers are dimensioned and configured to accommodate a plurality of generally planar objects. They are disposed in registered relationship relative to each other in an aesthetically desirable display. Since the planar objects are inserted through the display apparatus sides, size limitations are a disadvantage. To overcome this insufficiency additional modules were fabricated for attachment to each other.

A display rack is provided herein which is can be made to accommodate any number of planar objects of the type described. The objects are displayed side-by-side in picture fashion.

SUMMARY OF THE INVENTION

It will be appreciated that the invention relates to display racks for generally planar objects. A rack for displaying such objects in a clearly exhibiting, aesthetic arrangement is provided herein. The display rack is a square or rectangular frame having a top, a bottom, a back, and members at its sides. The side members are spaced so that the distance between them is an even multiple of the width of the objects to be displayed. With such widths, the number of the objects to be displayed will fill the frame between side members without unsightly spaces between them. A plurality of shelves are spaced from each other a distance equal to the height of the objects to be displayed. The objects can then be placed on the shelves and leaned against the frame back to fill the shelves aesthetically with no spaces between them. A plurality of kick bars are disposed between side members adjacent the frame back so as to be behind the displayed objects. Kick bars are spaced between each two shelves so that when an object being displayed is pushed toward the back of the rack on one side of the kick bar, the bar kicks out the other side of the object far enough so that it can be gripped for removal from the frame.

BRIEF DESCRIPTION OF THE DRAWINGS

This invention can, perhaps, be best understood from a description of the invention in conjunction with the accompanying drawings.

DETAILED DESCRIPTION OF THE INVENTION

Figure 1:
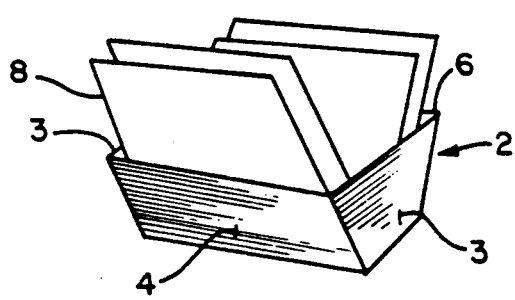
FIG. 1 is a perspective view of a prior art embodiment of the invention.

Referring first to FIG. 1, we find the simplest of Prior art record or compact disc display receptacles. The receptacle 2 is merely a bin with side walls 3, and front and back walls 4 and 6 adapted to hold the objects on their bottom ends. Front and back walls 4 and 6 are sloped outwardly so that the objects 8 can rest against them when being displayed and searched.

A more desirable rack is one, such as those illustrated in 4,367,000 and 2,649,968, capitalizing on the aesthetic appeal of the disc or record envelope artwork. As these two patents suggest, compact disc, record, and book, jackets should be displayed in engaging relationships which become part of a whole. These appealing displays are desirable from both a sales and storage point of view. One such receptacle is display rack 12a illustrated in FIG. 8 herein. A plurality of shelves 10 support objects 8 adjacent each other to form an integrated display resembling a picture in a frame, having sides 14, top 16, and bottom 18. Between side members 14, secured either to those sides or to the back (not shown) of display rack 12a, are shelves 10 upon which the objects 8 stand, leaning against the frame back.

Figure 8:
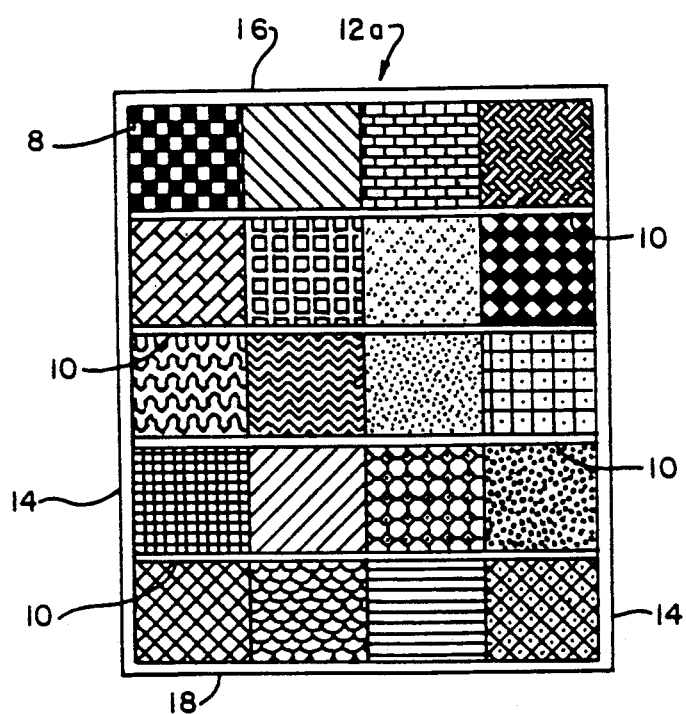
FIG. 8 is a front view of a display rack of the invention filled with compact discs.

One of the disadvantages of an aesthetic arrangement is that if the result is to have an integrated or unitary effect the objects should be positioned with no spaces between them as shown in FIG. 8. As a consequence it is difficult if not almost impossible to remove the objects without scratching, tearing, marring or otherwise harming the jackets. To overcome this problem, in 4,367,000, the objects are slipped in and out of the ends of the rack. This restricts the objects to columns of two so that the ends are accessible. To provide for more than two columns additional modules were utilized in 4,367,000. The invention herein solves the problem more effectively and simply, as will now be explained.

Figure 2:
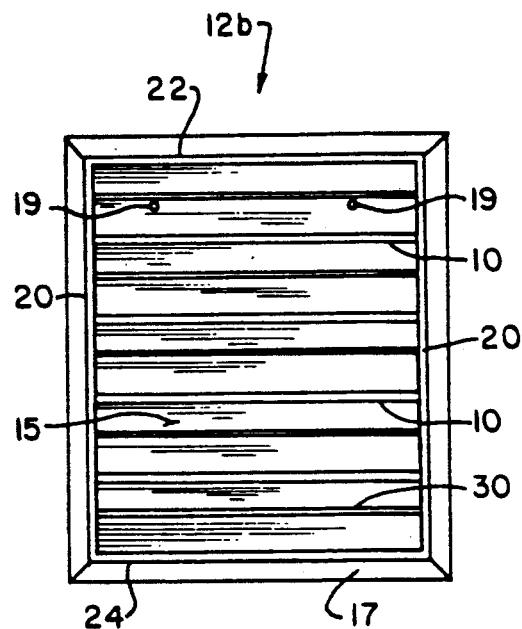
FIG. 2 is a front view of one form of an empty display rack.
Figure 3:
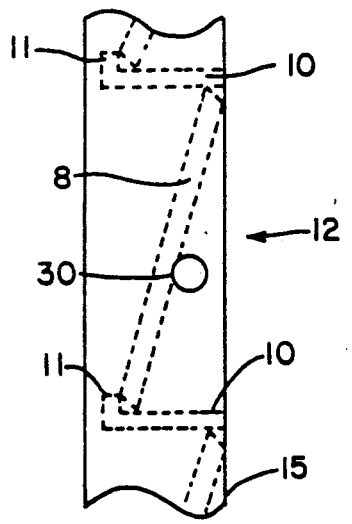
FIGS. 3 and 4 are diagrammatic representations of two embodiments of this invention.
Figure 5:
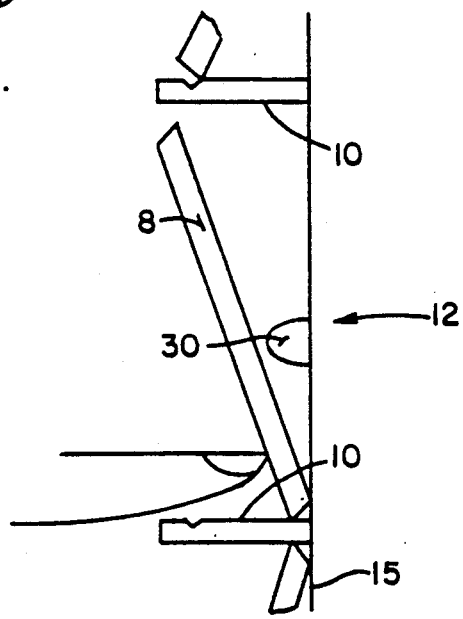
FIG. 5 is a diagrammatic view illustrating how the display rack functions.
Figure 4:
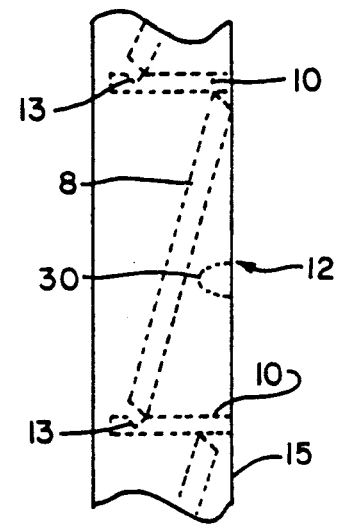

FIGS. 3 and 4 are partial side views of two embodiments of a display rack 12 of this invention. Shelves 10 are shown with one object 8 placed on them. It is to be noted that the objects are leaning (in slightly exaggerated fashion) against the frame back 15. Also visible in FIGS. 3 and 4 is a rod or bar 30. This rod 30 is a kick bar, and as such is an important feature of this invention. In our preferred embodiment of the invention a kick bar 30 extends from side to side above each shelf 10 and substantially parallel thereto as shown in FIG. 2. When the shelves are full, as shown in FIG. 8, the objects on them can only be removed with difficulty because they are so close together, and so close to the shelves. In such a situation kick bar or rib 30 comes into play. Desirably the kick bar is positioned so that when the lower end of the object 8 is urged toward the frame back 15 as shown in FIG. 5, the kick bar forces or kicks out the top end of the object, such as the compact disc illustrated in that figure. By gripping its top, compact disc 8 can then be readily removed from the rack.

The disposition of the kick bar relative to the shelves will depend upon the depth of each shelf 10. If the depth of the shelves is such that the compact discs are almost vertical, the kick bar can be disposed at the midpoint (from bottom to top) of object 8, or slightly higher. If shelf 10 is deeper so that the compact discs are not as vertically disposed, as shown in FIGS. 3 and 4, the kick bar can be below the midpoint between shelves. As a guide, the kick bar should be so disposed that it will kick the compact disc or other object beyond the shelf above it. It will be appreciated that the higher the kick bar is disposed relative to the displayed object, the less distance the top of the object will be pushed out. But while it is preferred that the kick bar be positioned about the midpoint of the object or below, it can be disposed above that midpoint between shelves.

DESCRIPTION OF PREFERRED EMBODIMENT

As indicated, a preferred embodiment of the invention is illustrated in FIG. 2. In this embodiment, for aesthetic purposes, the sides 20 of the display rack are members within an outer frame 17. Thus, the sides of the display rack can be the frame itself as shown in FIG. 8, or a rack within the frame, such as the display rack shown in FIG. 2. This display rack 12b is provided with side members 20, a top member 22 and bottom member 24 as explained hereinbefore. Rack 12b, thus, is a picture frame-like erection with an outer frame 17 surrounding the display rack.

In FIG. 2 the back 15 of the display rack is visible, as well as shelves 10. Above each shelf is a kick bar 30 adjacent the back of the framework. For home use it is contemplated that rack 12b will hang on a wall like a picture. Accordingly the unit includes holes 19, although double stick tape or wire hangers can be employed.

Having been given the teachings of this invention variations and ramifications will occur to those skilled in the art.

Figure 6:
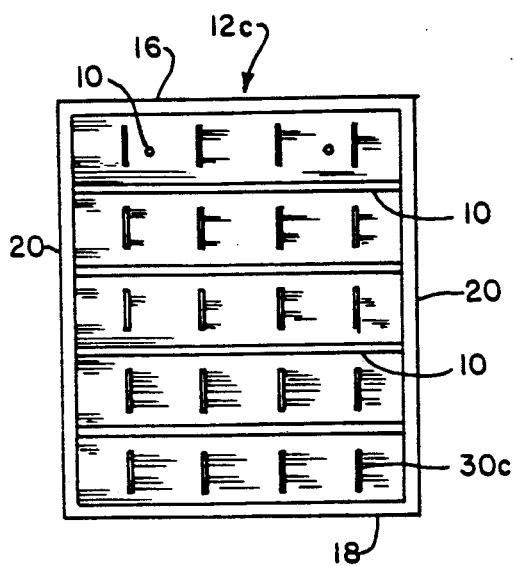
FIG. 6 is a front view of another form of an empty display rack.
Figure 7:
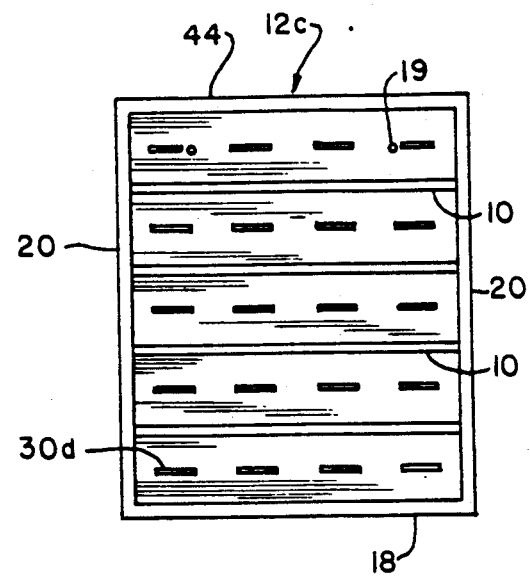
FIG. 7 is still another form of an empty display rack.

Two such embodiments are shown in FIGS. 6 and 7. The first form of the invention, rack 12c, is illustrated in FIG. 6. In this embodiment the kick bars 30c are substantially vertically disposed between shelves 10. In this unit the side of the compact disc is pressed, kicking out the opposite side, thus utilizing the principle of the invention.

The second embodiment of the invention is shown in FIG. 7. It will be noted that kick bar 30d of display rack 12d need not extend all the way across the distance between sides 20 as they did in the embodiment in FIG. 2. The kick bar 30d can be segmented as shown in FIG. 7. In display rack 12d individual kick bars 30d are similar to kick bars 30c in rack 12c of FIG. 6 except that they are horizontally disposed.

Other ramifications are also possible within the contemplation of this invention. Some of these are illustrated in FIGS. 3 and 4. For example the kick bar 30 can be in the form of a half round member attached to the back 15 of the display rack, as shown in FIG. 4, or it can be a rod held by sides 20 as can be seen in FIG. 3. It also need not be round, but can be half round (FIG. 4) or polygonal in cross section. It will also be appreciated that the depth of shelves 10 will depend upon the number of objects to be placed on them. While the objects in the front can be aesthetically displayed, additional objects can be stored behind them. Shelves 10 can be deep enough to accommodate them.

It is also desirable to provide means so the slanting objects will not slide readily off of the front of the shelf. A groove 13, illustrated in FIGS. 4 and 5, is provided for the purpose. As an added advantage, when a groove 13 is used, the kick bar can be used to slide the compact disc forward into the groove. Pressing on the compact disc above the kick bar urges the disc bottom forward into groove 13.

In another variation a ledge 11, shown in FIG. 3, can be used to hold the discs on the shelves. This ledge will, of course, not be utilized when vertical ribs (FIG. 6) are employed. The ledge would prevent the compact disc side from being urged or kicked outwardly. It has been suggested that video discs, records, tapes, and even books and other generally planar items can be the objects displayed. In still another form of the invention additional racks can be secured to single racks to form larger picture like units. Such modifications are deemed to be within the scope of this invention.

What is claimed is:

1. A rack for displaying generally planar objects in a manner permitting clear exhibition and an aesthetic arrangement of their displayed covers or wrappers comprising a square or rectangular frame having a top, a bottom, a back, and members at its sides, the distance between side members being an even multiple of the width of the objects to be displayed so that a given number of the objects fill the frame between side members without spaces between them, a plurality of shelves spaced from each other a distance equal tot eh height of the objects to be displayed such that the objects can be placed on them and leaned against the frame back to fill the shelves aesthetically with almost no spaces between them, a plurality of kick bars disposed adjacent the frame back, the kick bars being secured between shelves so that when the object being displayed is pushed toward the frame back on either side of the dick bar, the bar kicks out the other end of the object enabling it to be gripped for removal from the frame.

2. The display rack of claim 1 wherein a plurality of kickbars are positioned between the shelves, one behind each planar object.

3. The display rack of claim 2 wherein the kick bars are vertical.

4. The display rack of claim 2 wherein the kick bars are horizontal.

5. The display rack of claim 1 wherein the kick bars are positioned from side to side between shelves, spaced, one above each shelf substantially parallel thereto.

6. The display rack of claim 5 wherein the kick bar is held by the frame side members.

7. The display rack of claim 5 wherein the kick bar is attached to the back of the frame.

8. The display rack of claim 5 wherein the planar objects are compact discs.

9. The display rack of claim 5 wherein each shelf is provided with means for preventing an object being displayed from sliding off the shelf front.

10. The display rack of claim 5 wherein the means preventing an object from sliding off the shelf is a groove.

* * * * *